United States Patent
Dornig et al.

(10) Patent No.: US 12,085,454 B2
(45) Date of Patent: Sep. 10, 2024

(54) MONITORING AN ELECTRICAL ENERGY TRANSMISSION DEVICE

(71) Applicant: Siemens Energy Global GmbH & Co. KG, Munich (DE)

(72) Inventors: Mathias Dornig, Berlin (DE); Thilo Nehring, Berlin (DE); Richard Schulz, Berlin (DE); Matthias Heinecke, Berlin (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 36 days.

(21) Appl. No.: 17/918,269

(22) PCT Filed: Mar. 10, 2021

(86) PCT No.: PCT/EP2021/056022
§ 371 (c)(1),
(2) Date: Oct. 11, 2022

(87) PCT Pub. No.: WO2021/204486
PCT Pub. Date: Oct. 14, 2021

(65) Prior Publication Data
US 2023/0168131 A1    Jun. 1, 2023

(30) Foreign Application Priority Data
Apr. 9, 2020    (DE) ..................... 10 2020 204 609.3

(51) Int. Cl.
*G01K 3/10*    (2006.01)
*H02J 13/00*    (2006.01)

(52) U.S. Cl.
CPC .......... *G01K 3/10* (2013.01); *H02J 13/00002* (2020.01); *H02J 13/00022* (2020.01)

(58) Field of Classification Search
CPC . G01K 3/10; H02J 13/00022; H02J 13/00002
See application file for complete search history.

(56) References Cited

U.S. PATENT DOCUMENTS

2023/0116964 A1*    4/2023    Sun .......................... F24F 11/63
700/276

FOREIGN PATENT DOCUMENTS

| DE | 102010046141 A1 | 3/2012 |
|---|---|---|
| DE | 102011002870 A1 | 7/2012 |

(Continued)

OTHER PUBLICATIONS

Paulke, J. et al: "Thermal simulation of switchgear"; In: Proceedings of the ForthSeventh IEEE Holm Conference on Electrical Contacts (IEEE Cat. No. 01CH37192); Montreal, Que., Canada ; IEEE, 2001 ; ISBN 9780780366671, pp. 6-11.

*Primary Examiner* — Jared Fureman
*Assistant Examiner* — Duc M Pham
(74) *Attorney, Agent, or Firm* — Laurence A. Greenberg; Werner H. Stemer; Ralph E. Locher

(57) ABSTRACT

In a method for monitoring an electrical energy transmission device, time-resolved operating state data, environmental state data, and/or sensor sensor data are recorded. The operating state data relate to current, past and/or future operating states of the electrical energy transmission device; the environmental state data relate to current, past, and/or future states in an environment of the electrical energy transmission device; the sensor data are detected by at least one sensor of the electrical energy transmission device. The operating state data, the environmental data, and/or the sensor data are processed with a computational model to calculate a temperature curve of current, past and/or future temperatures of at least one module of the electrical energy transmission device. Based on the calculated temperature curve, a thermal load capacity of the module is determined based on a thermal load threshold for the module.

19 Claims, 4 Drawing Sheets

(56) References Cited

FOREIGN PATENT DOCUMENTS

DE      102015210397 A1 * 12/2016  ............... H02B 3/00
DE      102018103901 A1 *  8/2019  ......... G01R 31/3275

* cited by examiner

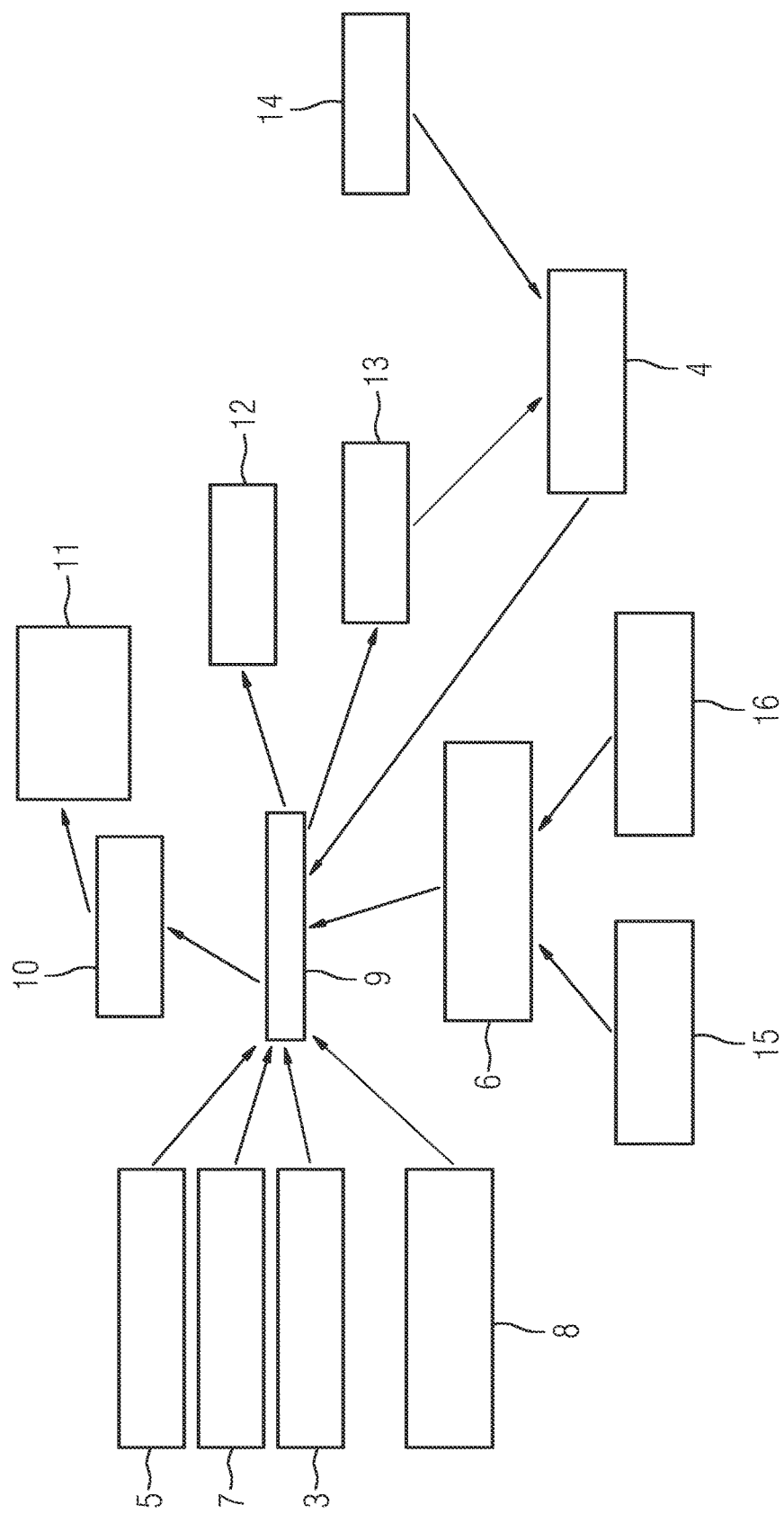

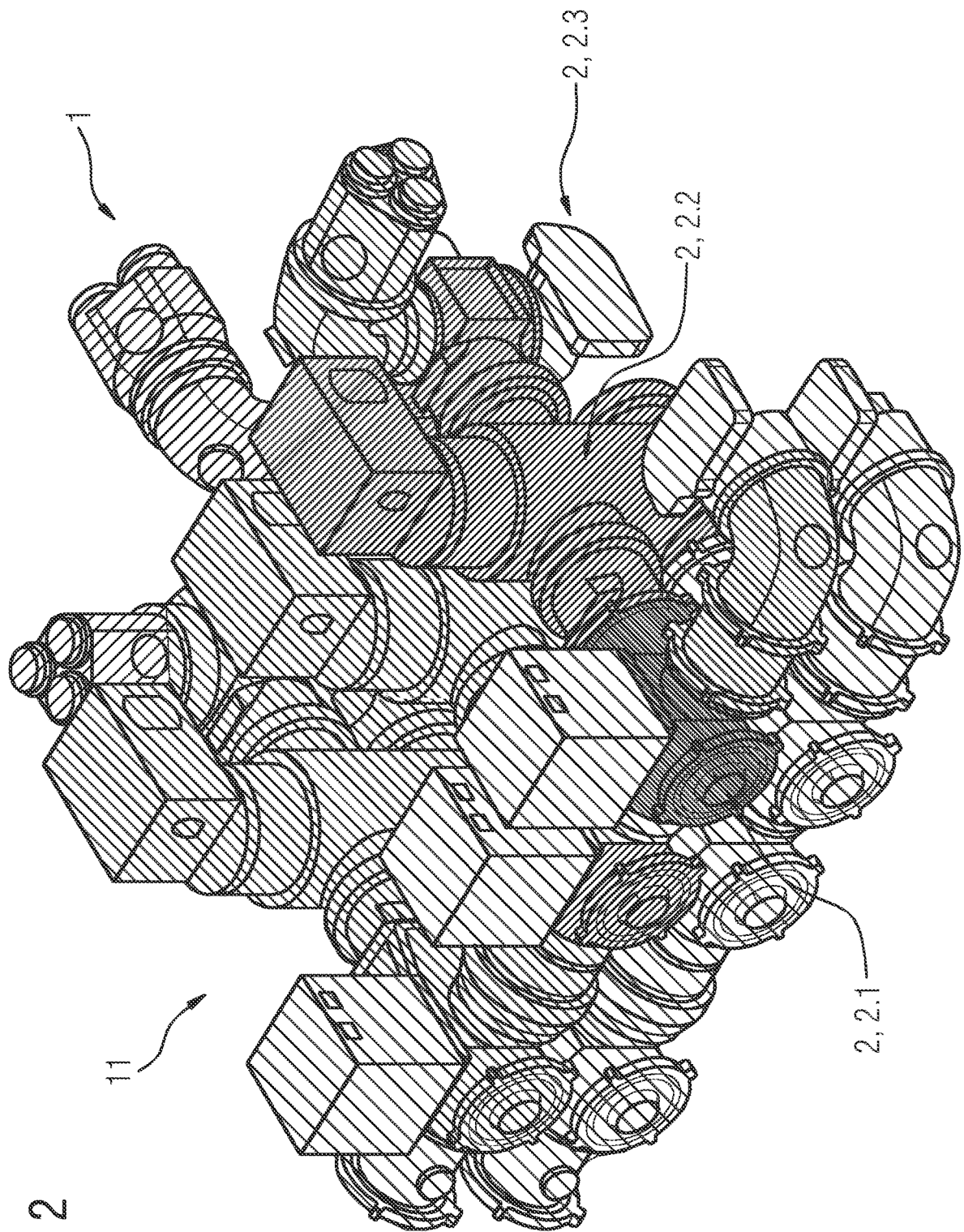

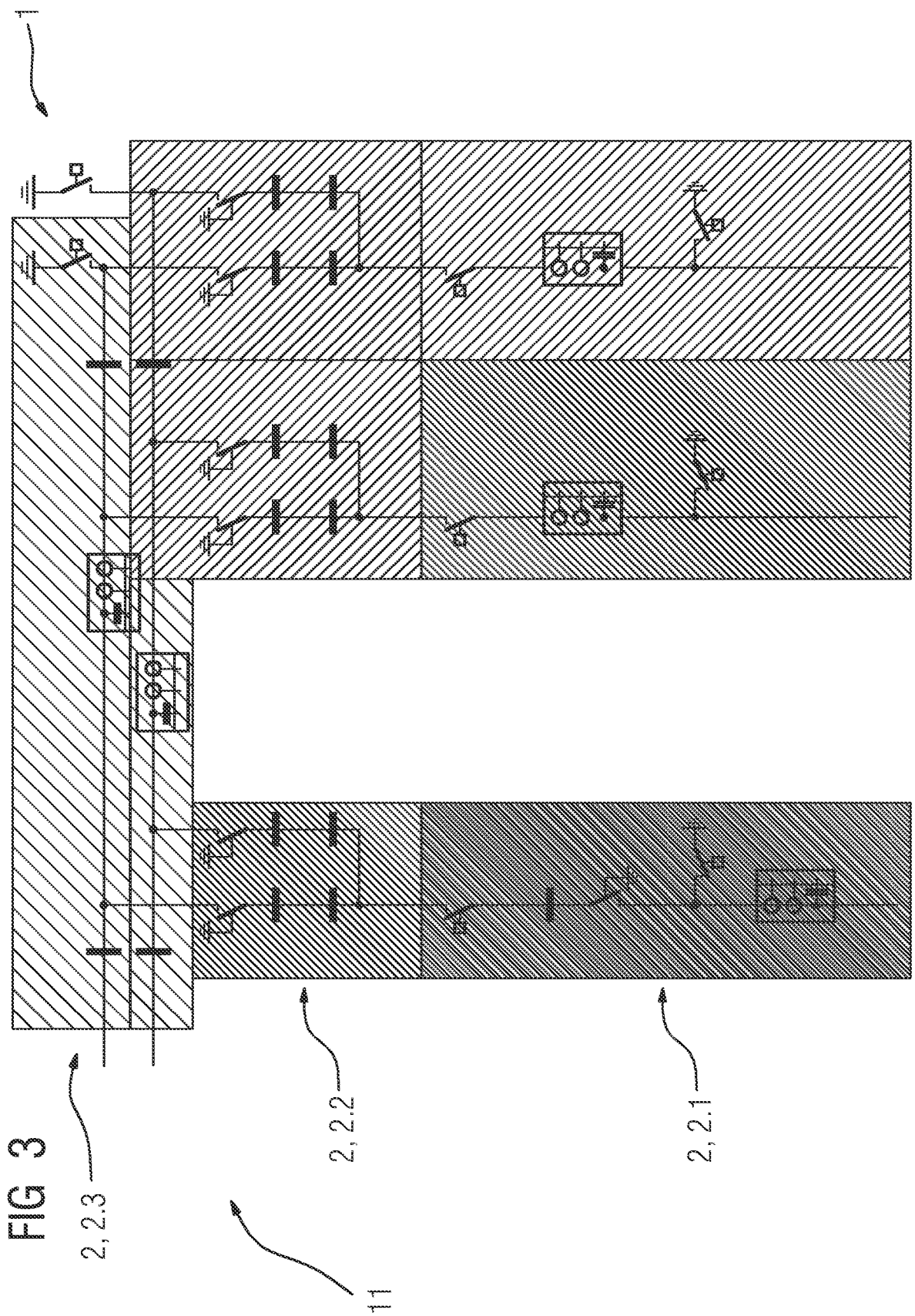

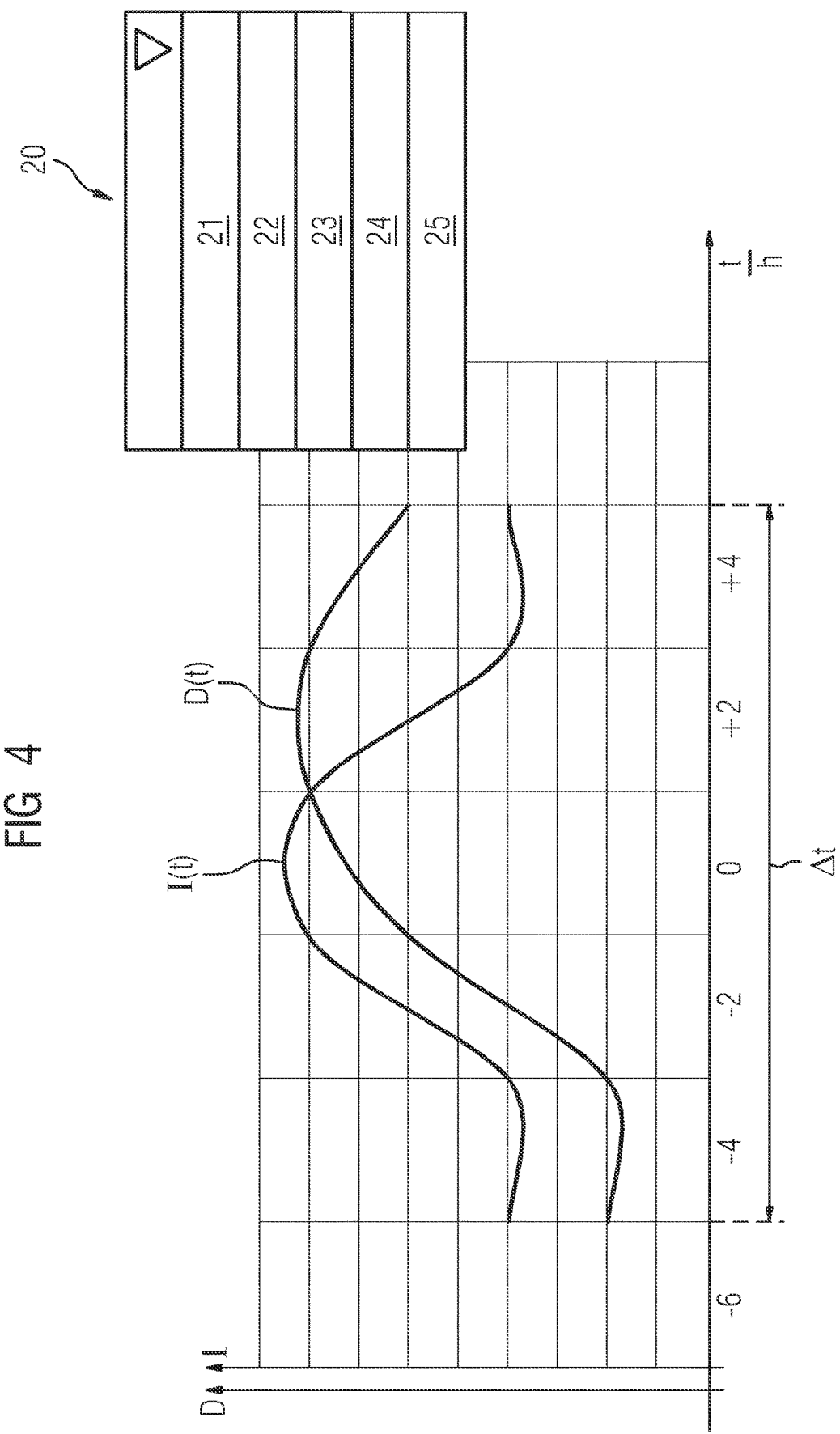

MONITORING AN ELECTRICAL ENERGY TRANSMISSION DEVICE

SPECIFICATION

Field and Background of the Invention

The invention relates to a method for monitoring an electrical energy transmission device, in particular a switchgear assembly.

A limiting factor for the current-carrying capacity of electrical energy transmission devices, for example switchgear assemblies, in particular high-voltage switchgear assemblies, is the heating of components caused by electrical losses. As a result of the lack of feedback relating to actual heating of components of an electrical energy transmission device, an electrical energy transmission device is generally operated far below its actual thermal load limit for safety reasons. In other words, electrical energy transmission devices are often not operated at a maximum permissible current for a present ambient temperature, with the result that actual heating of components of the electrical energy transmission device may often be far below permissible heating.

In addition, electrical energy transmission devices often have such a high thermal capacity that they can withstand electrical currents which considerably exceed a nominal current for a short time. This potential of an electrical energy transmission device is usually not utilized.

A problem opposing the utilization of the actual thermal load-bearing capacity of an electrical energy transmission device is that the temperature of some components (for example electrical conductors) currently cannot be captured using metrology. As a result, it is not possible to identify when permissible temperature limit values are exceeded in the event of a fault.

SUMMARY OF THE INVENTION

The invention is based on the object of specifying a method for monitoring an electrical energy transmission device, which method makes it possible to operate the electrical energy transmission device up to its maximum thermal load-bearing capacity.

The object is achieved, according to the invention, by means of a method having the features as claimed, a computer program having the features as claimed and an electrical energy transmission device having the features as claimed.

The subclaims relate to advantageous configurations of the invention.

In the method according to the invention for monitoring an electrical energy transmission device, in particular a switchgear assembly, time-resolved operating state data relating to present, past and/or future operating states of the electrical energy transmission device, environmental state data relating to present, past and/or future environmental states in an environment of the electrical energy transmission device and/or sensor data which are and/or have been captured by at least one sensor of the electrical energy transmission device are recorded. A temperature profile of present, past and/or future temperatures of at least one module of the electrical energy transmission device is calculated by means of a calculation model processing the operating state data, environmental state data and/or sensor data, and a thermal utilization of the module is determined using the calculated temperature profile on the basis of a thermal load limit for the module.

The method according to the invention makes it possible to precisely determine temperature profiles of the temperatures of individual modules by taking into account time-resolved operating state data relating to operating states of the electrical energy transmission device, environmental state data relating to environmental states in an environment of the electrical energy transmission device and/or sensor data. Time-resolved data are understood here as meaning data which are each assigned a time, for example by virtue of the data each having a digital time stamp. Taking the time-resolved operating state data and the environmental state data into account makes it possible, for example, for sensor data, which are captured at individual measurement points at or in the electrical energy transmission device and are used to directly or indirectly determine temperatures at these measurement points, to be used to also calculate and in particular predict temperatures at other locations of the electrical energy transmission device and temperature profiles of individual modules. As a result, only a few sensors are needed to determine the temperature profiles of individual modules, and temperature and temperature profiles can also be calculated for locations or modules at which temperatures are not captured or cannot be captured using metrology.

This precise and comprehensive calculation of the temperature profiles of individual modules makes it possible, in particular, to operate the electrical energy transmission device at its thermal load limit and enables brief overload operation of the electrical energy transmission device, with the result that the thermal load-bearing capacity and therefore the actual potential of the electrical energy transmission device can be utilized to the maximum extent. In addition, it makes it possible to improve the operational reliability of the electrical energy transmission device by being able to detect and eliminate or predict and prevent local overheating of the electrical energy transmission device. The calculation of the temperature profiles of individual modules may also be advantageously used as a basis for improved control of active cooling of the electrical energy transmission device.

In one configuration of the invention, the calculation model mathematically simulates the operation of at least one module, has a mathematical model of at least one module and/or evaluates module data relating to geometrical, physical and/or chemical properties of at least one module. This makes it possible to advantageously increase the accuracy of the temperature calculation by taking into account the specific properties of individual modules in the calculation model.

In a further configuration of the invention, a present and/or at least one past and/or future degree of utilization of the electrical energy transmission device is determined using at least one calculated temperature profile on the basis of the thermal load limit of at least one module. The degree of utilization of the electrical energy transmission device is understood as meaning a utilization of the electrical energy transmission device in relation to a maximum permissible utilization. For example, the degree of utilization is defined by a thermal utilization in relation to a maximum permissible thermal utilization. Determining the degree of utilization advantageously makes it possible to quantitatively assess the utilization of the electrical energy transmission device and thereby facilitates the optimization thereof.

In a further configuration of the invention, a thermal utilization of at least one module is visualized on the basis of its thermal load limit and/or the degree of utilization of the electrical energy transmission device is visualized. For example, the visualization comprises a colored representation of at least one module, the color of which is assigned to a temperature calculated for the module on the basis of the thermal load limit of the module. Furthermore, provision may be made for a period for which the thermal utilization of at least one module and/or the degree of utilization of the electrical energy transmission device is/are visualized to be able to be set. Such visualizations advantageously enable a quick overview of the thermal load and the utilization of the electrical energy transmission device and, in particular, make it possible to detect modules with a high thermal load and possible optimizations of the operation of the electrical energy transmission device.

In a further configuration of the invention, the thermal load limit of a module is defined as a temperature threshold value specific to the module. This implements expedient and simple quantitative determination of a load limit.

In a further configuration of the invention, a warning is generated if the temperature profile calculated for a module exceeds the temperature threshold value defined for the module. This makes it possible to automatically indicate overload operation of the electrical energy transmission device or to warn of overloading of the electrical energy transmission device.

In a further configuration of the invention, a tolerance period is defined and a warning is output only when the temperature profile calculated for a module exceeds the temperature threshold value defined for the module for longer than the tolerance period. This advantageously makes it possible to tolerate only brief and therefore uncritical overloading of a module, with the result that unnecessary disconnection of the module or of the entire electrical energy transmission device can be avoided.

In a further configuration of the invention, a warning is output if a temperature of a module, as calculated by means of the calculation model for a time, differs from a temperature of the module measured at this time by more than a predefinable absolute or relative tolerance value. This advantageously indicates possible errors of the calculation model or of calculations carried out using the calculation model.

In a further configuration of the invention, operating settings which are dependent on the temperatures of at least one module are defined for the electrical energy transmission device and operating instructions are output in response to the operating settings on the basis of at least one calculated temperature profile and/or operating settings are automatically made on the basis of at least one calculated temperature profile. This makes it possible to automatically generate suggestions for optimizing the operation of the electrical energy transmission device or even enables automated optimization of the operation of the electrical energy transmission device.

In a further configuration of the invention, the operating state data comprise information relating to a switching state of at least one electrical switching unit, an operating state of at least one active cooling apparatus and/or an electrical operating current and/or an electrical power of at least one component of the electrical energy transmission device and/or of the entire electrical energy transmission device. These operating state data are particularly relevant operating state data for determining the thermal load of the electrical energy transmission device and are therefore particularly suitable for calculating the temperature profiles.

In a further configuration of the invention, the environmental state data comprise information relating to a temperature, a wind speed, precipitation, a humidity and/or a radiation intensity of electromagnetic radiation in the environment of the electrical energy transmission device. These environmental state data are particularly relevant environmental state data for determining the thermal load of the electrical energy transmission device and are therefore particularly suitable for calculating the temperature profiles.

In a further configuration of the invention, the sensor data comprise temperatures captured at at least one measurement point at or in the electrical energy transmission device. This advantageously makes it possible to take into account and evaluate actual temperatures of the electrical energy transmission device for the purpose of calculating the temperature profiles.

In a further configuration of the invention, the calculation model is constructed in a modular manner with libraries for taking into account individual modules. As a result, the calculation model can be advantageously adapted to a change in the electrical energy transmission device and can be used for different electrical energy transmission devices.

In a further configuration of the invention, the operating state data, environmental state data and/or sensor data are at least partially recorded in a data cloud and/or the temperature profile of at least one module is calculated by means of the calculation model in a data cloud. As a result, the operating state data, environmental state data and/or sensor data and/or the calculated temperature profiles can be advantageously retrieved and used in a manner independent of the location and user. Provision may also be made for operating state data, environmental state data and/or sensor data and/or the calculated temperature profiles to be able to be downloaded from the data cloud and used off-line.

A computer program according to the invention comprises instructions which, when the computer program is executed by a control unit or in a data cloud, cause it to carry out the method according to the invention.

An electrical energy transmission device according to the invention comprises a control unit, on which a computer program according to the invention is executed, or a connection to a data cloud, in which a computer program according to the invention is executed.

The above-described properties, features and advantages of this invention and the manner in which they are achieved become clearer and more distinctly comprehensible in connection with the following description of exemplary embodiments which are explained in more detail in connection with the drawings, in which:

BRIEF DESCRIPTION OF THE FIGURES

FIG. 1 shows a structure diagram of an exemplary embodiment of the method according to the invention for monitoring an electrical energy transmission device, FIG. 2 shows a first visualization of an electrical energy transmission device with a representation of temperatures of modules of the electrical energy transmission device, FIG. 3 shows a second visualization of an electrical energy transmission device with a representation of temperatures of modules of the electrical energy transmission device, FIG. 4 shows a visualization of temporal profiles of a degree of utilization and an input current of an electrical energy transmission device.

DETAILED DESCRIPTION OF THE INVENTION

FIG. 1 (FIG. 1) shows a structure diagram of an exemplary embodiment of the method according to the invention for monitoring an electrical energy transmission device 1 having different modules 2 (see FIG. 2).

In the method, time-resolved operating state data 3 relating to present and past operating states of the electrical energy transmission device 1, operating state data 4 relating to future operating states of the electrical energy transmission device 1, environmental state data 5 relating to present and past environmental states in an environment of the electrical energy transmission device 1, environmental state data 6 relating to future environmental states in an environment of the electrical energy transmission device 1, sensor data 7 which are and/or have been captured by at least one sensor of the electrical energy transmission device 1 and module data 8 relating to geometrical, physical and/or chemical properties of at least one module 2 are recorded, for example in a data cloud.

A temperature profile 10 of present, past and/or future temperatures is respectively calculated for different modules of the electrical energy transmission device 1 by means of a calculation model 9 processing the operating state data 3, 4, environmental state data 5, 6, sensor data 7 and module data 8. Thermal utilizations of the modules 2 are determined using the calculated temperature profiles 10 on the basis of thermal load limits for the modules 2. The calculation model 9 is executed in a data cloud, for example. A thermal load limit of a module 2 is defined, for example, on the basis of a data sheet describing the module 2, a safety rule and/or a standard. The thermal load limit of a module 2 is defined as a temperature threshold value specific to the module 2.

Furthermore, a present and/or at least one past and/or future degree of thermal utilization of at least one module 2 is determined using the calculated temperature profiles 10 on the basis of the thermal load limit of said module and/or a present and/or at least one past and/or future degree of thermal utilization D of the electrical energy transmission device 1 is determined on the basis of the thermal load limits of the modules 2. A degree of utilization of a module 2 is defined, for example, as a deviation of a temperature calculated for the module 2 from the temperature threshold value defined for the module 2 or as a ratio of this deviation to the temperature threshold value. The determined degrees of utilization and degrees of utilization D are visualized with a visualization 11, see FIGS. 2 to 4 and the description thereof in this respect.

Provision may also be made for a warning 12 to be generated if the temperature profile 10 calculated for a module 2 exceeds the temperature threshold value defined for the module 2. Alternatively or additionally, provision may be made for a tolerance period to be defined and for a warning 12 to be output only when the temperature profile calculated for a module 2 exceeds the temperature threshold value defined for the module 2 for longer than the tolerance period. This advantageously makes it possible to tolerate only brief and therefore uncritical overloading of a module 2, with the result that unnecessary disconnection of the module 2 or of the entire electrical energy transmission device 1 can be avoided. A warning 12 can also be output if a temperature of a module 2, as calculated by means of the calculation model for a time, differs from a temperature of the module 2 measured at this time by more than a predefinable absolute or relative tolerance value.

Furthermore, operating settings which are dependent on the temperatures of the modules 2 are defined for the electrical energy transmission device 1 and operating instructions 13 are generated in response to the operating settings on the basis of the calculated temperature profiles 10 and/or operating settings are automatically made on the basis of the calculated temperature profiles 10. Such operating settings are, for example, changing an electrical operating current of a component of the electrical energy transmission device 1 and/or of the entire electrical energy transmission device 1 or switching an active cooling apparatus on or off. In addition, an operating instruction 13 may recommend, for example, the maintenance or the replacement of one or more individual components of the electrical energy transmission device 1, for example exchange of a busbar.

The operating state data 3, 4 comprise information relating to a switching state of at least one electrical switching unit, an operating state of at least one active cooling apparatus and/or an electrical operating current and/or an electrical power of at least one component of the electrical energy transmission device 1 and/or of the entire electrical energy transmission device 1, for example. The operating state data 3 relating to present and past operating states of the electrical energy transmission device 1 are provided, for example, by a control unit which controls the electrical energy transmission device 1. The operating state data 4 relating to future operating states of the electrical energy transmission device are taken, for example, from a manually or automatically generated operating specification 14 for operating the electrical energy transmission device 1 and/or from the generated operating instructions 13.

The environmental state data 5, 6 comprise information relating to a temperature, a wind speed, precipitation, a humidity and/or a radiation intensity of electromagnetic radiation (for example the solar radiation) in the environment of the electrical energy transmission device 1, for example. The environmental state data 5 relating to present and past environmental states in the environment of the electrical energy transmission device 1 are provided, for example, by a weather station, separate measurement devices and/or by a database of a data cloud. The environmental state data 6 relating to future environmental states in the environment of the electrical energy transmission device 1 are taken, for example, from a weather forecast 15 for the environment of the electrical energy transmission device 1 and/or from a user input 16 manually carried out by a user or operator of the electrical energy transmission device 1.

The sensor data 7 comprise, in particular, temperatures captured at at least one measurement point at or in the electrical energy transmission device 1.

The module data 8 relating to a module 2 are taken, for example, from a data sheet describing the module 2.

FIGS. 2 and 3 (FIG. 2 and FIG. 3) each show a visualization of an electrical energy transmission device 1 with a representation of temperatures of modules 2 of the electrical energy transmission device 1. In this example, the electrical energy transmission device 1 is a switchgear assembly, the modules 2 of which are, inter alia, isolating switch modules 2.1 having switching units in the form of isolating switches, circuit breaker modules 2.2 having switching units in the form of circuit breakers and outgoer modules 2.3 having switching units in the form of grounding switches. FIG. 2 shows a three-dimensional visualization 11 with a realistic representation of the electrical energy transmission device 1, and FIG. 3 shows a two-dimensional visualization 11 in the form of a circuit diagram of the electrical energy transmission device 1. The temperatures respectively calculated for the modules 2 are represented by a colored representation of the modules 2, wherein the color in which a module 2 is represented is assigned to the temperature calculated for the module 2 on the basis of the thermal load limit of the module 2. For example, temperature ranges are defined for each module 2 on the basis of the thermal load limit of the module 2 and a color is assigned to each temperature range. For example, a module 2 is represented in red if the temperature calculated for the module 2 exceeds the temperature threshold value defined for the module 2. Accordingly, a module 2 may be represented in green, for example, if the temperature calculated for the module 2 considerably falls below the temperature threshold value defined for the module 2 and may be represented in yellow at higher temperatures below the temperature threshold value and in orange for temperatures which are in a temperature range, the upper limit of which is the temperature threshold value defined for the module 2. The various colors are represented in FIGS. 2 and 3 by means of different hatchings.

FIG. 4 (FIG. 4) shows, by way of example, a visualization of a degree of utilization D and an input current I of an electrical energy transmission device 1 in the form of profiles D(t) of the degree of utilization D and I(t) of the input current I on the basis of a time t. A period Δt for which the profiles D(t) and I(t) are determined and displayed can be set. Furthermore, a selection menu 20 having buttons 21 to 25 can be used to select variables, the temporal profiles of which are alternatively or additionally represented in the period Δt. For example, a button 21 is assigned to the degree of utilization D of the electrical energy transmission device 1, a button 22 is assigned to the input current I of the electrical energy transmission device 1 and the further buttons 23 to 25 are each assigned to a further variable, for example a variable characterizing an environmental state, such as a temperature, a wind speed, precipitation, a humidity or a radiation intensity in the environment of the electrical energy transmission device 1, or an operating characteristic variable of the electrical energy transmission device 1, such as a switching state of a switching unit or a degree of thermal utilization of an individual module 2 of the electrical energy transmission device 1.

Although the invention has been described and illustrated more specifically in detail by means of preferred exemplary embodiments, the invention is not restricted by the disclosed examples and other variations can be derived therefrom by a person skilled in the art without departing from the scope of protection of the invention.

The invention claimed is:

1. A method for monitoring an electrical energy transmission device, the method comprising:
recording data selected from the group consisting of:
operating state data, being time-resolved data relating to at least one of present, past, or future operating states of the electrical energy transmission device;
environmental state data relating to at least one of present, past, or future environmental states in an environment of the electrical energy transmission device; and
sensor data captured by at least one sensor of the electrical energy transmission device;
calculating a temperature profile of at least one of present, past, or future temperatures of the at least one module of the electrical energy transmission device by way of a calculation model processing at least one of the operating state data, the environmental state data, or the sensor data, wherein the calculation model mathematically simulates an operation of the at least one module, has a mathematical model of the at least one module, and/or evaluates module data relating to properties of the at least one module selected from the group consisting of geometrical, physical, and chemical properties of the at least one module; and
determining a thermal utilization of the at least one module using the calculated temperature profile on a basis of a thermal load limit for the module.

2. The method according to claim 1, which comprises recording sensor data that are being captured and/or that have been captured by the at least one sensor.

3. The method according to claim 1, which comprises visualizing at least one of a thermal utilization of at least one module on a basis of the thermal load limit of the at least one module or a degree of utilization of the electrical energy transmission device.

4. The method as claimed in claim 3, which comprises visualizing with a color representation of at least one module, and assigning the color to a temperature calculated for the module on the basis of the thermal load limit of the module.

5. The method according to claim 4, which comprises defining the thermal load limit of a module as a temperature threshold value specific to the module.

6. The method according to claim 5, which comprises generating a warning when the temperature profile calculated for a given module exceeds the temperature threshold value defined for the given module.

7. The method according to claim 1, which comprises defining operating settings for the electrical energy transmission device which are dependent on the temperatures of at least one module and outputting operating instructions and/or automatically executing operating settings based on at least one calculated temperature profile.

8. The method according to claim 1, wherein the operating state data comprise data with information selected from the group consisting of a switching state of at least one electrical switching unit, an operating state of at least one active cooling apparatus, an electrical operating current, an electrical power of at least one component of the electrical energy transmission device, and an electrical power of the entire electrical energy transmission device.

9. The method according to claim 1, wherein the environmental state data comprise data with information selected from the group consisting of a temperature, a wind speed, precipitation, a humidity, and a radiation intensity of electromagnetic radiation in the environment of the electrical energy transmission device.

10. The method according to claim 1, wherein the sensor data comprise temperature readings captured at measurement point at the electrical energy transmission device or in the electrical energy transmission device.

11. The method according to claim 1, wherein the calculation model is a modular construction with libraries for taking into account individual modules.

12. The method according to claim 1, which comprises recording the operating state data, the environmental state data, and sensor data at least partially a data cloud, and/or the temperature profile of the at least one module is calculated by a calculation model in a data cloud.

13. The method according to claim 12, wherein the electrical energy transmission device is a switchgear assembly.

14. A computer program on a non-transitory medium, comprising computer-executable instructions which, when the computer program is executed by a control unit or in a data cloud, implement the method according to claim 1.

15. An electrical energy transmission device, comprising a control unit configured to execute a computer program with instructions for carrying out the method according to claim 1.

16. An electrical energy transmission device, comprising a connection to a data cloud, and a computer program to be executed in the data cloud for implementing the method according to claim 1.

17. A method for monitoring an electrical energy transmission device, the method comprising:
recording data selected from the group consisting of:
  operating state data, being time-resolved data relating to at least one of present, past, or future operating states of the electrical energy transmission device;
  environmental state data relating to at least one of present, past, or future environmental states in an environment of the electrical energy transmission device; and
  sensor data captured by at least one sensor of the electrical energy transmission device;
calculating a temperature profile of at least one of present, past, or future temperatures of the at least one module of the electrical energy transmission device by way of a calculation model processing at least one of the operating state data, the environmental state data, or the sensor data; and
determining a thermal utilization of the at least one module using the calculated temperature profile on a basis of a thermal load limit for the module; and
determining a degree of utilization selected from the group consisting of a present, at least one past, and a future degree of utilization of the electrical energy transmission device using the temperature profile calculated on the basis of the thermal load limit of the at least one module.

18. The method according to claim 17, wherein the calculation model mathematically simulates an operation of the at least one module, has a mathematical model of the at least one module, and/or evaluates module data relating to properties of the at least one module selected from the group consisting of geometrical, physical, and chemical properties of the at least one module.

19. A method for monitoring an electrical energy transmission device, the method comprising:
recording data selected from the group consisting of:
  operating state data, being time-resolved data relating to at least one of present, past, or future operating states of the electrical energy transmission device;
  environmental state data relating to at least one of present, past, or future environmental states in an environment of the electrical energy transmission device; and
  sensor data captured by at least one sensor of the electrical energy transmission device;
calculating a temperature profile of at least one of present, past, or future temperatures of the at least one module of the electrical energy transmission device by way of a calculation model processing at least one of the operating state data, the environmental state data, or the sensor data;
visualizing at least one of a thermal utilization of at least one module on a basis of the thermal load limit of the at least one module or a degree of utilization of the electrical energy transmission device, visualizing with a color representation of at least one module, and assigning the color to a temperature calculated for the module on the basis of the thermal load limit of the module, and defining the thermal load limit of a module as a temperature threshold value specific to the module;
generating a warning when the temperature profile calculated for a given module exceeds the temperature threshold value defined for the given module, and defining a tolerance period and outputting the warning only when the temperature profile calculated for a module exceeds the temperature threshold value defined for the module for a longer period of time than the tolerance period; and
determining a thermal utilization of the at least one module using the calculated temperature profile on a basis of a thermal load limit for the module.

\* \* \* \* \*